United States Patent [19]

Kobayashi et al.

[11] Patent Number: 4,765,634
[45] Date of Patent: Aug. 23, 1988

[54] METAL GASKET FOR A CYLINDER HEAD ON AN INTERNAL COMBUSTION ENGINE

[75] Inventors: Masaaki Kobayashi, Koshigaya; Norio Hanba, Urawa; Akira Tanaka, Ohmiya; Tsunehiko Abe, Kawaguchi, all of Japan

[73] Assignee: Nippon Leakless Industry Co., Ltd., Tokyo, Japan

[21] Appl. No.: 917,514

[22] Filed: Oct. 10, 1986

[30] Foreign Application Priority Data

Oct. 12, 1985 [JP] Japan .................... 60-155248[U]

[51] Int. Cl.[4] .......................................... F16J 15/08
[52] U.S. Cl. ........................ 277/235 B; 277/213; 277/236
[58] Field of Search ........... 277/227, 233, 234, 235 R, 277/235 B, 236, 213, 217

[56] References Cited

U.S. PATENT DOCUMENTS

| | | | |
|---|---|---|---|
| 922,130 | 5/1909 | Goetze | 277/213 |
| 1,812,578 | 6/1931 | Bailey | 277/213 X |
| 1,840,147 | 1/1932 | Woolson | 277/235 B X |
| 1,851,948 | 3/1932 | Summers | 277/213 X |
| 2,034,610 | 3/1936 | Dickson | 277/235 B X |
| 2,152,630 | 4/1939 | Balfe | 277/235 B X |
| 4,548,170 | 10/1985 | Forsthuber et al. | 123/198 E X |

FOREIGN PATENT DOCUMENTS

| | | | |
|---|---|---|---|
| 1003523 | 2/1957 | Fed. Rep. of Germany | 277/235 B |
| 970950 | 12/1958 | Fed. Rep. of Germany | 277/213 |
| 810728 | 1/1937 | France | 277/235 B |
| 58-91352 | 5/1983 | Japan | 277/235 B |
| 60-3465 | 1/1985 | Japan | 277/235 B |
| 384379 | 12/1932 | United Kingdom | 277/213 |
| 1305366 | 1/1973 | United Kingdom | 277/235 B |

*Primary Examiner*—Robert S. Ward
*Attorney, Agent, or Firm*—Young & Thompson

[57] ABSTRACT

A metal gasket for a cylinder head of an internal combustion engine comprises at least one narrow portion extending between cylinder bores of the cylinder head to be sealed by the gasket, and beads extending along circumferences of the cylinder bores. The adjacent beads extend in opposite directions with respect to the gasket, thereby enabling the adjacent beads to be smoothly and gently connected. Such smoothly connected beads prevent any cracks or permanent deformations in the proximity of the beads from occuring when the gasket is firmly clamped between the cylinder head and an engine body. Restoring faculty of the gasket is not lost after being clamped therebetween, so that the sealing capacity in the proximities of the beads is remarkably improved in comparison with the prior art.

4 Claims, 3 Drawing Sheets

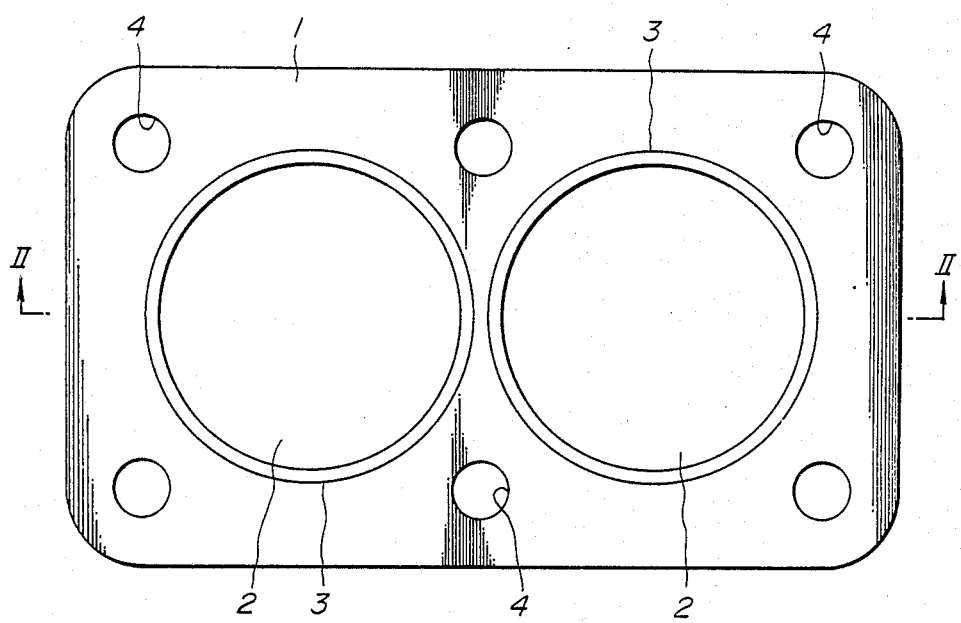
FIG_1 PRIOR ART
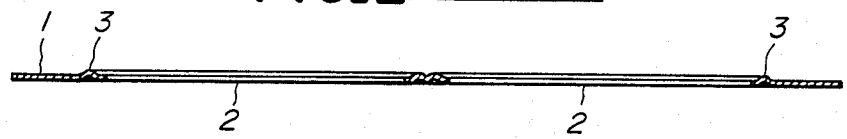
FIG_2 PRIOR ART
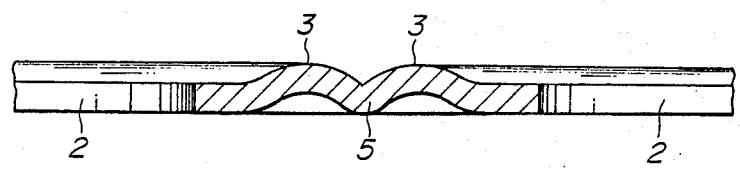
FIG_3 PRIOR ART

FIG_4
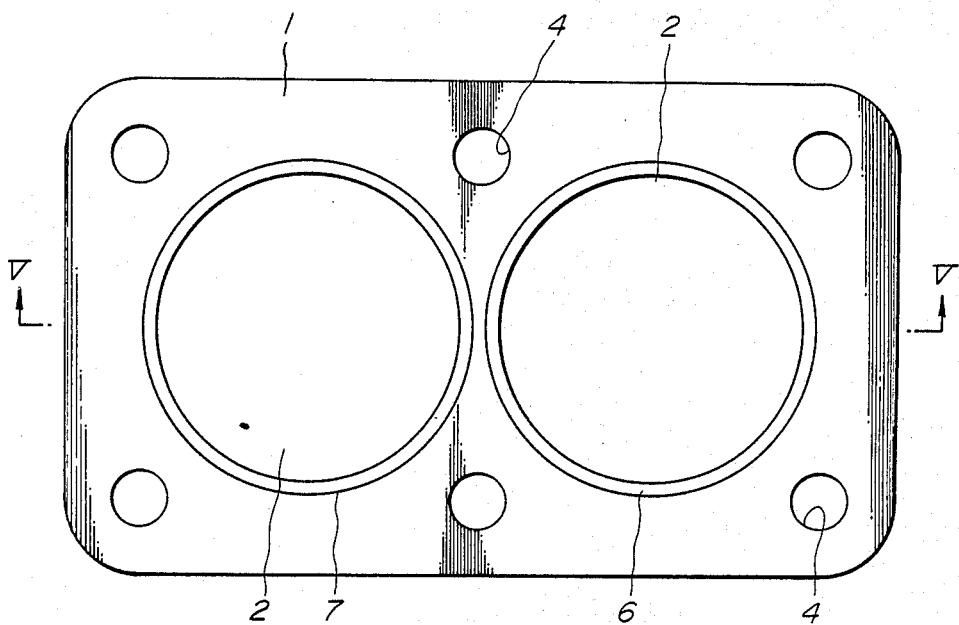
FIG_5
FIG_6
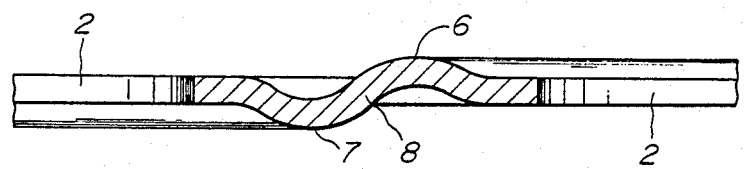

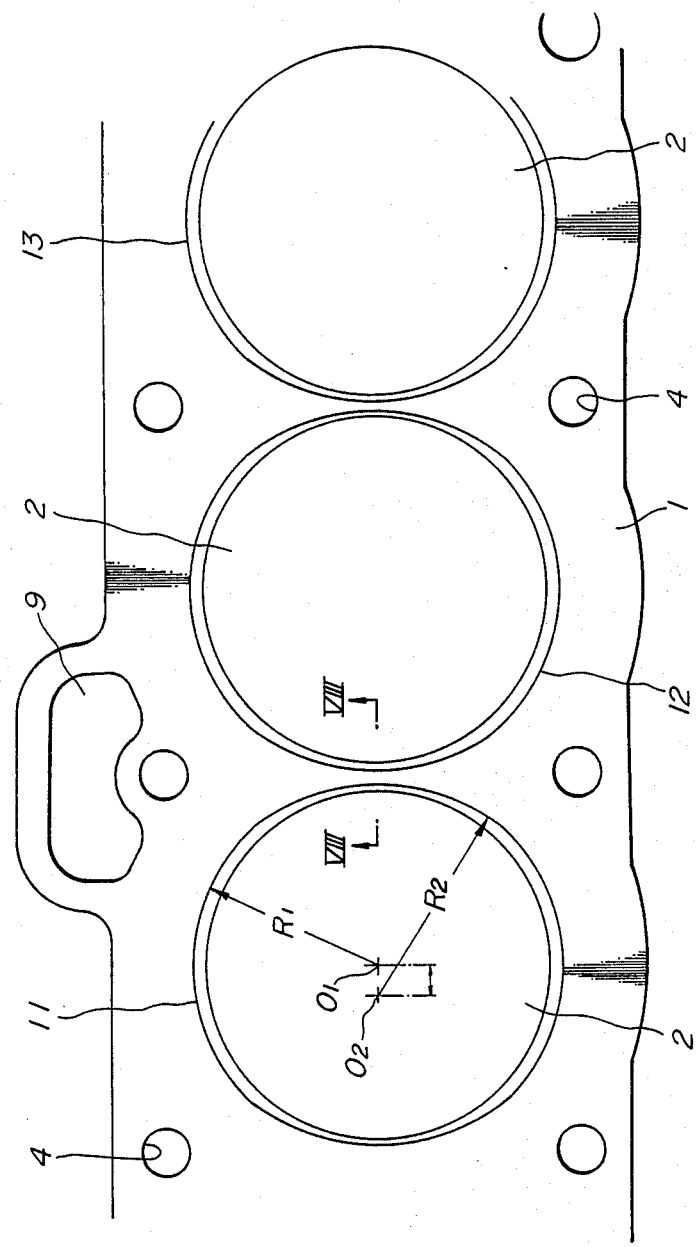
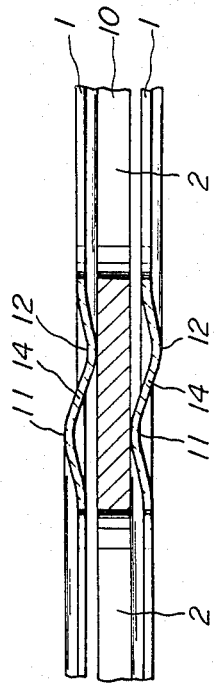

METAL GASKET FOR A CYLINDER HEAD ON AN INTERNAL COMBUSTION ENGINE

BACKGROUND OF THE INVENTION

This invention relates to a metal gasket for a cylinder head of an internal combustion engine and more particularly to a metal gasket suitable for an engine whose cylinder bores are closely adjacent to each other.

FIGS. 1-3 illustrate one example of a hitherto used metal gasket, wherein a metal gasket is made of a spring steel plate 1 as a blank material and is formed with head 3 along circumferences of cylinder bores 2 and with apertures 4 for bolts.

With such a metal gasket, the beads 3 extend in the same directions as shown in FIG. 3. In case of the cylinder bores 2 closely adjacent to each other, therefore, the adjacent beads 3 are not smoothly connected at a connection 5 which is sharply bent as shown in FIG. 3. Accordingly, it is generally difficult to form the sharply bent connection 5. Moreover, when the gasket is firmly clamped between a cylinder head and an engine cylinder, cracks or permanent deformation would often occur in the connection 5, due to its sharp bent portion, so that the cracked or deformed portions of the gasket do not return to original positions. As a result, sealing performance of the gasket is lowered in the proximity of the connection 5.

SUMMARY OF THE INVENTION

It is a principal object of the invention to provide an improved metal gasket which eliminates all the disadvantages of the prior art.

In order to achieve this object, in a metal gasket including at least one narrow portion extending between bores of a body to be sealed by the gasket and beads extending along circumferences of said bores of the body, according to the invention adjacent beads extend in opposite directions with respect to the gasket.

With this arrangement, the adjacent beads can be connected smoothly or gently.

In a preferred embodiment, circles formed by crests of the beads are made different from true circles concentric to said bores.

In another embodiment, the gasket comprises two steel plates and a steel plate as a core member interposed between the two steel plates, and the adjacent beads are formed in the two steel plates, respectively.

According to the invention, the adjacent beads located along the circumferences of the bores extend in opposite directions with respect to the gasket. As a result, the adjacent beads are smoothly connected, so that the beads are easily formed in producing the gasket. The gasket can be firmly clamped between a cylinder head and an engine body without cracks or permanent deformations in the beads and therefore with losing restoring faculty of the gasket. Accordingly, the gasket according to the invention has a significant effect in that the sealing capacity in the proximities of the beads is remarkably improved in comparison with the prior art.

The invention will be more fully understood by referring to the following detailed specification and claims taken in connection with the appended drawings.

BRIEF DESCRIPTION OF THE DRAWINGS

FIG. 1 is a plan view illustrating one example of a metal gasket of the prior art;

FIG. 2 is a sectional view taken along the line II—II in FIG. 1;

FIG. 3 is a partial enlarged sectional view of the gasket shown in FIG. 1;

FIG. 4 is a plan view illustrating a metal gasket according to the invention;

FIG. 5 is a sectional view taken along the line V—V in FIG. 4;

FIG. 6 is a partial enlarged sectional view of the gasket shown in FIG. 4;

FIG. 7 is a partial plan view illustrating another embodiment of the metal gasket according to the invention; and FIG. 8 is a partial enlarged sectional view taken along the line VIII—VIII in FIG. 7.

DESCRIPTION OF THE PREFERRED EMBODIMENTS

FIGS. 4-8 illustrate preferred embodiments of the invention, wherein like components are designated by the same reference numerals as those used in FIGS. 1-3.

Referring to FIGS. 4-6 illustrating a first embodiment of the invention, a bead 6 to be arranged about a cylinder bore 2 on the right side as viewed in FIG. 4 extends upward and a bead 7 to be arranged about a cylinder bore 2 on the left side extends downward as viewed in FIG. 6. In other words, the adjacent beads 6 and 7 extend in opposite directions with respect to the gasket 1.

With this arrangement, the beads 6 and 7 can be smoothly or gently connected at a connection 8 as shown in FIG. 6.

FIGS. 7 and 8 illustrate a second embodiment of the invention, wherein a gasket is formed with an opening 9 for a lubricant and comprises two spring steel plates 1 and a steel plate 10 as a core material interposed between two steel plates 1.

In this case, also each spring steel plate 1 is provided correspondingly to circumferences of respective cylinder bores 2 with beads 11, 12 and 13. Each the bead extends in a direction opposite to a direction in which an adjacent bead extends. As shown in FIG. 8, therefore, the beads 11 and 12 are smoothly or gently connected with each other at a connection 14.

In this embodiment, moreover, circles formed by crests of the beads of the gasket located at circumferences of cylinder bores of an engine are made different from true circles concentric to the cylinder bores.

In more detail, the circle 11 shown in FIG. 7 consists of an arc having a radius $R_1$ whose center coincides with a center $O_1$ of the cylinder bore 2, and an arc having a radius $R_2$ ($R_2 > R_1$) whose center is at $O_2$ which is eccentric from the center $O_1$ of the cylinder bore 2 by a distance l.

This second embodiment is particularly effective in case that cylinder bores are closely adjacent with each other.

As can be seen from the above explanation, according to the invention adjacent beads of a gasket located about circumferences of cylinder bores extend in opposite directions with respect to the gasket. As a result, the adjacent beads are smoothly connected, so that the beads are easily formed in producing the gasket. The gasket can be firmly clamped between a cylinder head and an engine body without cracks or permanent deformations in the beads and therefore without losing restoring faculty of the gasket. Accordingly, the gasket according to the invention has a significant effect in that the sealing capacity in the proximities of the beads is remarkably improved in comparison with the prior art.

In the second embodiment of the invention, circles formed by crests of the beads located at circumferences of cylinder bores are made different from true circles concentric to cylinder bores. As a result, beads of the gasket can be formed with ease without any trouble even they are closely adjacent to each other, much more they are located in sufficient spaces.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A metal gasket including at least one narrow portion extending between bores of a body to be sealed by the gasket and beads extending along circumferences of said bores of the body, adjacent beads extending in opposite directions with respect to the gasket, wherein circles formed by crests of said beads are different from true circles concentric to said bores.

2. A metal gasket as set forth in claim 1, wherein said adjacent beads are connected smoothly.

3. A metal gasket including at least one narrow portion extending between bores of a body to be sealed by the gasket and beads extending along circumferences of said bores of the body, adjacent beads extending in opposite directions with respect to the gasket, wherein said gasket comprises two steel plates and a steel plate as a core member interposed between said two steel plates, and said adjacent beads are formed in said two steel plates, respectively.

4. A metal gasket as set forth in claim 3, wherein said adjacent beads are connected smoothly.

* * * * *